UNITED STATES PATENT OFFICE 2,378,110

BIURET DERIVATIVES

John Kenson Simons, Toledo, Ohio, and Welcome I. Weaver, Pittsburgh, Pa., assignors, by mesne assignments, to Libbey-Owens-Ford Glass Company, a corporation of Ohio No Drawing. Application July 8, 1942, Serial No. 450,192

3 Claims. (Cl. 260—553)

The invention relates to novel biuret derivatives and particularly to novel monomeric reaction products of biuret and formaldehyde.

Large quantities of dimethylol urea are used commercially in the manufacture of organic soluble reaction products for use in enamels and other coating compositions. Biuret is one of the simplest of urea derivatives, but no monomeric reaction products of biuret and formaldehyde have been known heretofore. Hence, it has not been possible to use biuret for the preparation of organic solutions by a method similar to the extensively used method in which urea is first converted into dimethylol urea and then treated to produce an organic soluble product.

The principal object of the invention is to provide novel monomeric reaction products of formaldehyde and biuret. More specific objects and advantages are apparent from the description, which discloses and illustrates the invention, and is not intended to impose limitations upon the claims.

The novel carbon compounds embodying the invention have the general formula

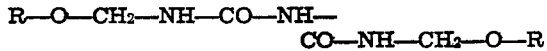

in which R is selected from the group consisting of H and CH$_3$.

Dimethylol biuret may be prepared by reacting biuret with formaldehyde in aqueous solution at a pH from about 7 to 9. The preferred pH for the reaction is about 7.6. As the reaction proceeds, there is a drop of about .4 to about .6 of a pH, and when the pH has fallen to about 7, there is no further formation of dimethylol biuret until the pH is raised by addition of a small amount of an alkali. If the pH is allowed to go too low, a viscous solution of a condensation product results and no dimethylol biuret can be recovered.

Since commercial aqueous formaldehyde solution has a pH of about 4, a base is added to bring the pH of the solution within the required range. Any organic or inorganic base, such as triethanolamine, pyridine or sodium hydroxide may be employed. Triethanolamine is preferred because it is a weak base and, therefore, does not need to be measured out so carefully in adjusting the pH, and because it gives a final product that is less difficult than usual to isolate as a crystalline material.

An excess of formaldehyde may be used for the reaction if desired. A large excess of formaldehyde such as 10 mols of formaldehyde for each mol of biuret increases the speed of the reaction and also increases the difficulty of separating the crystalline product. The preferred proportion is 3 mols of formaldehyde for every mol of biuret. The reaction can also be carried out with an excess of biuret such as 1 mol of biuret for each mol of formaldehyde.

Gentle refluxing of the reaction solution on an open flame for 30 minutes as described in Example 1 produces the same degree of reaction as heating for two hours on a water bath, but the former procedure is preferred because it produces a reaction product that is more crystalline and easier to purify. Reaction for a longer time at a slightly lower temperature appears to cause considerable condensation.

Example 1

Biuret (51.5 grams) is added to 120 grams of 37 per cent aqueous formaldehyde solution to which has been added a sufficient amount of 50 per cent aqueous triethanolamine solution to give the reaction mixture a pH of 7.6. After 30 minutes of gentle refluxing on an open flame, an analysis indicates that 1.7 mols of formaldehyde have reacted for each mol of biuret. The solution is evaporated in vacuum at room temperature and the resulting crude crystalline product is filtered and then washed with acetone. Recrystallization from ethanol or ethyl acetate produces a 43 per cent yield of dimethylol biuret, a white substance that melts at 139–140° C. with decomposition into a clear liquid. This substance is very soluble in water and is soluble in hot ethanol or ethyl acetate, but is insoluble in hot or cold acetone. When heated, it sets to a hard insoluble resin.

Example 2

115 cc. of methanol and 12 drops of 5 normal hydrochloric acid are added to 11.5 grams of dimethylol biuret. The mixture is stirred for 20 minutes to produce a solution, and the acid is then neutralized with silver carbonate, and the solution is filtered. Concentration of the filtrate at room temperature under vacuum produces a crude crystalline product which may be crystalized from "Hi-Flash" solvent in large clusters of needles. 12 per cent yield of 1,5-dimethoxymethyl biuret melting at 95–96° C. is obtained.

Example 3

3 grams of 1,5-dimethoxymethyl biuret, 20 grams of n-butanol and 0.03 gram of maleic acid are heated to evaporate the excess of n-butanol. The product is a clear, light yellow viscous liquid which when poured out in a film and baked for 25 to 30 minutes at 105° C. gives a clear hard film that is insoluble in xylene or the monoethyl ether of ethyleneglycol.

Example 4

40 grams of dimethylol biuret, 400 cc. of methanol and 2 cc. of 5 normal hydrochloric acid are stirred for 10 minutes to produce a solution. The solution is neutralized with silver carbonate and then filtered. After the addition of 400 cc. of n-butanol and .5 gram of maleic acid to the filtrate, the solution is concentrated by vacuum distillation to produce 100 grams of a clear, slightly yellow coating composition containing 51 per cent solids. When poured out in a film and baked at 115° C. for 15 to 20 minutes, this composition produces a clear hard film.

Example 5

An alcohol solution containing 60 grams of dimethylol biuret is brought to a pH below 6 by addition of alcoholic phthalic acid, and the resulting solution is used to impregnate 50 grams of alphacellulose. After the mass has been dried in an oven at 80° C., 1 per cent by weight of zinc stearate is added and the mixture is pulverized in a ball mill. The resulting composition can be molded at a temperature of 150–160° C. under a pressure of 1 to 4 tons per square inch.

Variou embodiments of the invention may be devised to meet various requirements.

Having described the invention, we claim:

1. A novel carbon compound having the general formula $R-O-CH_2-NH-CO-NH-CO-NH-CH_2-O-R$ in which R is selected from the group consisting of H and $CH_3$.

2. As a novel carbon compound, 1,5-dimethylol biuret.

3. As a novel carbon compound, 1,5-dimethoxymethyl biuret.

JOHN KENSON SIMONS.
WELCOME I. WEAVER.